(12) United States Patent
Bradea (10) Patent No.: US 8,615,720 B2
(45) Date of Patent: Dec. 24, 2013

(54) HANDHELD ELECTRONIC DEVICE AND ASSOCIATED METHOD EMPLOYING A GRAPHICAL USER INTERFACE TO OUTPUT ON A DISPLAY VIRTUALLY STACKED GROUPS OF SELECTABLE OBJECTS

(75) Inventor: Marcel Bradea, Kitchener (CA)

(73) Assignee: BlackBerry Limited, Waterloo (CA)

( * ) Notice: Subject to any disclaimer, the term of this patent is extended or adjusted under 35 U.S.C. 154(b) by 1058 days.

(21) Appl. No.: 11/946,242

(22) Filed: Nov. 28, 2007
(Under 37 CFR 1.47)

(65) Prior Publication Data
US 2009/0138823 A1  May 28, 2009

(51) Int. Cl.
*G06F 3/048* (2013.01)
(52) U.S. Cl.
USPC ........... 715/835; 715/764; 715/817; 715/818; 715/828; 715/834; 715/810; 715/848
(58) Field of Classification Search
USPC ......... 715/810, 835, 764, 817, 818, 828, 834, 715/848
See application file for complete search history.

(56) References Cited

U.S. PATENT DOCUMENTS

| | | | |
|---|---|---|---|
| 5,644,334 A | 7/1997 | Jones et al. | |
| 5,745,710 A | 4/1998 | Clanton et al. | |
| 5,841,855 A | 11/1998 | Davidson et al. | |
| 6,005,578 A | 12/1999 | Cole | |
| 6,184,884 B1 | 2/2001 | Nagahara et al. | |
| 6,211,921 B1 * | 4/2001 | Cherian et al. | 348/565 |
| 6,215,490 B1 * | 4/2001 | Kaply | 715/788 |
| 6,373,505 B1 | 4/2002 | Bellamy et al. | |
| 6,590,594 B2 * | 7/2003 | Bates et al. | 715/784 |
| 7,089,506 B2 * | 8/2006 | Gantenhammer et al. | 715/850 |
| 7,091,998 B2 * | 8/2006 | Miller-Smith | 715/810 |
| 7,111,788 B2 * | 9/2006 | Reponen | 235/472.01 |
| 7,142,890 B2 * | 11/2006 | Irimajiri et al. | 455/566 |
| 7,490,297 B2 * | 2/2009 | Bates et al. | 715/784 |
| 7,496,853 B2 * | 2/2009 | Awada et al. | 715/767 |
| 7,503,014 B2 * | 3/2009 | Tojo et al. | 715/810 |
| 7,543,245 B2 * | 6/2009 | Irimajiri | 715/836 |
| 7,562,312 B2 * | 7/2009 | Rochford et al. | 715/848 |
| 7,685,530 B2 * | 3/2010 | Sherrard et al. | 715/764 |
| 7,743,341 B2 * | 6/2010 | Brodersen et al. | 715/810 |

(Continued)

FOREIGN PATENT DOCUMENTS

| | | |
|---|---|---|
| EP | 1710673 | 10/2006 |
| WO | 9736251 | 10/1997 |
| WO | 2004023283 A1 | 3/2004 |

OTHER PUBLICATIONS

European Search Report on corresponding European Patent Application No. 07121807 dated Apr. 25, 2008; 2 pages.

*Primary Examiner* — Patrick Riegler
(74) *Attorney, Agent, or Firm* — Ridout & Maybee LLP (57) ABSTRACT

A handheld electronic device and an improved method employ a GUI to depict a plurality of selectable objects on a display. The selectable objects are arranged in groups, with at least one of the groups being depicted on the display at any given time. The groups are arranged in rings, and the rings are in a virtually stacked arrangement, which enables the user to progressively depict one group of selectable objects after the next. An indicator and a large background, individually or in combination, indicate to the user which ring of selectable objects from the plurality of stacked rings is currently active.

16 Claims, 7 Drawing Sheets

(56) References Cited

U.S. PATENT DOCUMENTS

| | | |
|---|---|---|
| 7,770,135 B2 * | 8/2010 | Fitzmaurice .................. 715/856 |
| 2002/0041292 A1 | 4/2002 | Son et al. |
| 2006/0020904 A1 * | 1/2006 | Aaltonen et al. ............. 715/850 |
| 2006/0055789 A1 * | 3/2006 | Jin et al. ..................... 348/208.12 |
| 2006/0069997 A1 | 3/2006 | Hsieh et al. |
| 2006/0075355 A1 * | 4/2006 | Shiono et al. ................. 715/778 |
| 2006/0161847 A1 * | 7/2006 | Holecek et al. ............... 715/716 |
| 2006/0224998 A1 * | 10/2006 | Riss et al. ..................... 715/848 |
| 2006/0279541 A1 * | 12/2006 | Kim et al. ..................... 345/158 |
| 2007/0063995 A1 * | 3/2007 | Bailey et al. .................. 345/184 |
| 2007/0126732 A1 * | 6/2007 | Robertson et al. ............ 345/419 |
| 2007/0136681 A1 * | 6/2007 | Miller ........................... 715/782 |
| 2007/0152981 A1 * | 7/2007 | Im et al. ........................ 345/173 |
| 2007/0164989 A1 * | 7/2007 | Rochford et al. ............. 345/156 |
| 2007/0261006 A1 * | 11/2007 | Reissmueller et al. ....... 715/837 |
| 2007/0271528 A1 * | 11/2007 | Park et al. ..................... 715/810 |
| 2007/0288868 A1 * | 12/2007 | Rhee et al. .................... 715/840 |
| 2008/0059896 A1 * | 3/2008 | Anderson et al. ............. 715/764 |
| 2008/0244454 A1 * | 10/2008 | Shibaike ....................... 715/835 |
| 2008/0250349 A1 * | 10/2008 | Peiro et al. .................... 715/810 |
| 2008/0307364 A1 * | 12/2008 | Chaudhri et al. ............. 715/836 |
| 2010/0306703 A1 * | 12/2010 | Bourganel et al. ............ 715/823 |

\* cited by examiner

HANDHELD ELECTRONIC DEVICE AND ASSOCIATED METHOD EMPLOYING A GRAPHICAL USER INTERFACE TO OUTPUT ON A DISPLAY VIRTUALLY STACKED GROUPS OF SELECTABLE OBJECTS

BACKGROUND

1. Field

The disclosed and claimed concept relates generally to handheld electronic devices and, more particularly, to a handheld electronic device on which is implemented a graphical user interface (GUI) which manages the displaying and manipulation of selectable objects that are in the exemplary form of icons.

2. Description of the Related Art

Numerous types of handheld electronic devices are known. Examples of such handheld electronic devices include, for instance, personal data assistants (PDAs), handheld computers, two-way pagers, cellular telephones, and the like. Many handheld electronic devices also feature a wireless communication capability, although many such handheld electronic devices are stand-alone devices that are functional without communication with other devices.

As technology has advanced, handheld electronic devices have become more sophisticated and have provided greater numbers of features, and such features have been implemented on devices that have grown progressively smaller. As a result, designers of handheld electronic devices have often been challenged with regard to the best way in which to enable the selection of features that may be employed by a user. Some systems employ a graphical user interface (GUI) which graphically depicts on a display certain objects that are each representative of a feature or routine and, if selected by a user, initiate the operation of such feature or routine. For instance, an exemplary GUI might visually depict on a display a plurality of icons that can be selected by a user to initiate a feature or routine that is represented by the selected icon. Another exemplary GUI displays menus and submenus, all of which are in a tree-like structure, with the various menu items being selectable to initiate a feature or routine that is represented by the selected menu item.

Such systems have not, however, been without limitation. As is generally understood in the relevant art, users of handheld electronic devices typically can direct at most only a limited amount of attention to the operation of a handheld electronic device, typically because the user is involved in other activities, hence the portable nature of handheld electronic devices. It thus would be desirable to provide an improved handheld electronic device on which can be implemented an improved method of presenting to a user the various selectable features that are available on the handheld electronic device.

BRIEF DESCRIPTION OF THE DRAWINGS

A full understanding of the disclosed and claimed concept can be obtained from the following Description when read in conjunction with the accompanying drawings in which:

Similar numerals refer to similar parts throughout the specification.

DESCRIPTION

Figure 1:
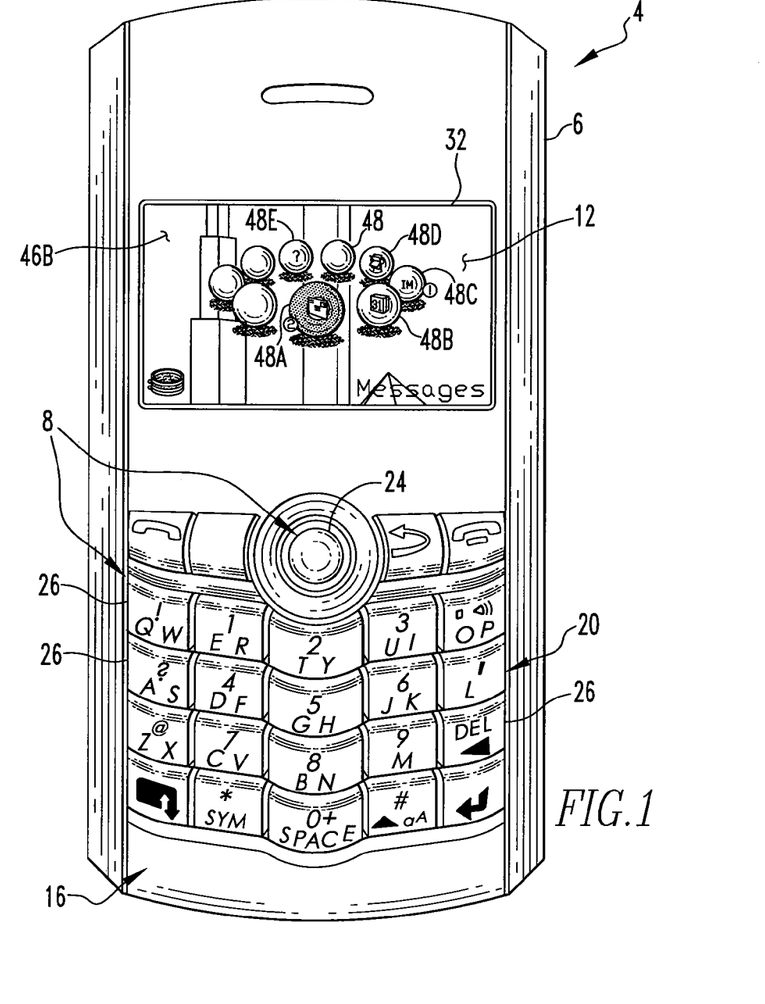
FIG. 1 is a front elevational view of an exemplary handheld electronic device in accordance with the disclosed and claimed concept upon which is performed an improved method in accordance with the disclosed and claimed concept.
Figure 2:
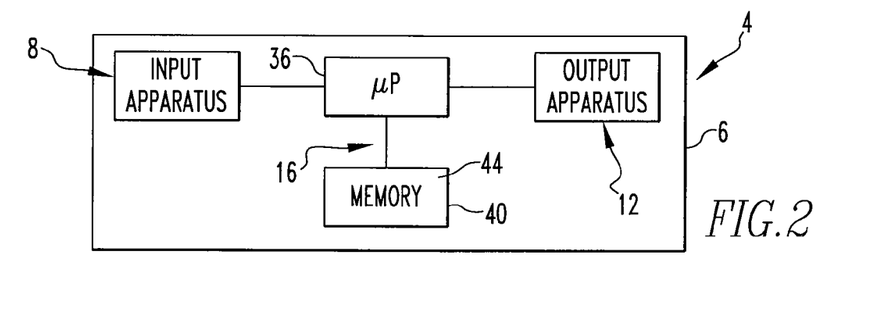
FIG. 2 is a schematic depiction of the handheld electronic device of FIG. 1.

An improved handheld electronic device 4 in accordance with the disclosed and claimed concept is indicated generally in FIG. 1 and is depicted schematically in FIG. 2. The improved handheld electronic device 4 comprises a housing 6, and further comprises an input apparatus 8, an output apparatus 12, and a processor apparatus 16 disposed on the housing 6. The input apparatus 8 provides input to the processor apparatus 16. The processor apparatus 16 provides output signals to the output apparatus 12.

The input apparatus 8 comprises a keypad 20 and a track ball 24. The keypad 20 in the exemplary embodiment depicted herein comprises a plurality of keys 26 that are each actuatable to provide input to the processor apparatus 16. The track ball 24 is rotatable to provide navigational, scrolling, and other input to the processor apparatus 16, and additionally is translatable in a direction inwardly toward the handheld electronic device 4 to provide other inputs, such as selection inputs. By way of example, a scrolling input can be provided by rotating the track ball 24 a predetermined rotational distance. In the exemplary embodiment depicted herein, the track ball 24 provides tactile feedback or audible feedback or both to a user upon rotation of the track ball 24, such as with each rotation of the track ball 24 the predetermined rotational distance.

The track ball 24 is freely rotatable on the housing 6 and thus is able to provide navigational inputs in the vertical direction, i.e., the up-down direction, in the horizontal direction, i.e., the left-right direction, as well as combinations thereof. The keys 26 and the track ball 24 serve as input members which are actuatable to provide input to the processor apparatus 16. The exemplary output apparatus 12 comprises a display 32.

Many of the keys 26 each have a plurality of letters, i.e., linguistic elements, assigned thereto. For instance, one of the keys 26 has assigned thereto the letters "A" and "S". Another of the keys 26 has assigned thereto the letters "Q" and "W". The letters of the exemplary keypad 20 are in an arrangement of a reduced QWERTY keyboard.

Examples of other input members not expressly depicted herein would include, for instance, a mouse or track wheel for providing navigational inputs, such as could be reflected by movement of a cursor on the display 32, and other inputs such as selection inputs. Still other exemplary input members would include a touch-sensitive display, a stylus pen for making menu input selections on a touch-sensitive display displaying menu options and/or soft buttons of a graphical user interface (GUI), hard buttons disposed on the housing 6 of the handheld electronic device 4, and so on. Examples of other output devices would include a touch-sensitive display, an audio speaker, and so on.

The processor apparatus 16 comprises a processor 36 and a memory 40. The processor 36 may be, for example and without limitation, a microprocessor (μP) that interfaces with the memory 40. The memory 40 can be any one or more of a variety of types of internal and/or external storage media such as, without limitation, RAM, ROM, EPROM(s), EEPROM(s), FLASH, and the like that provide a storage register, i.e., a machine readable medium, for data storage such as in the fashion of an internal storage area of a computer, and can be volatile memory or nonvolatile memory. The memory 40 has stored therein a number of routines 44 that are executable on the processor 36. As employed herein, the expression "a number of" and variations thereof shall refer broadly to any nonzero quantity, including a quantity of one. One of the routines 44 is a disambiguation routine that is operable to disambiguate ambiguous text input, such as when one of the keys 26 having a plurality of letters assigned thereto is actuated.

Another of the routines 44 is a graphical user interface (GUI) with which the user can interact and which, as can be seen in FIG. 1, is operable to visually output a background 46B on the display 32. The GUI is additionally operable to output a group of selectable objects in the form of icons 48 which can be said to expressly include the icons 48A, 48B, 48C, 48D, and 48E, among other icons 48. It is noted that the icons 48 are depicted in an enlarged fashion in FIGS. 3-6 and are depicted without the background 46B for purposes of clarity.

Figure 3:
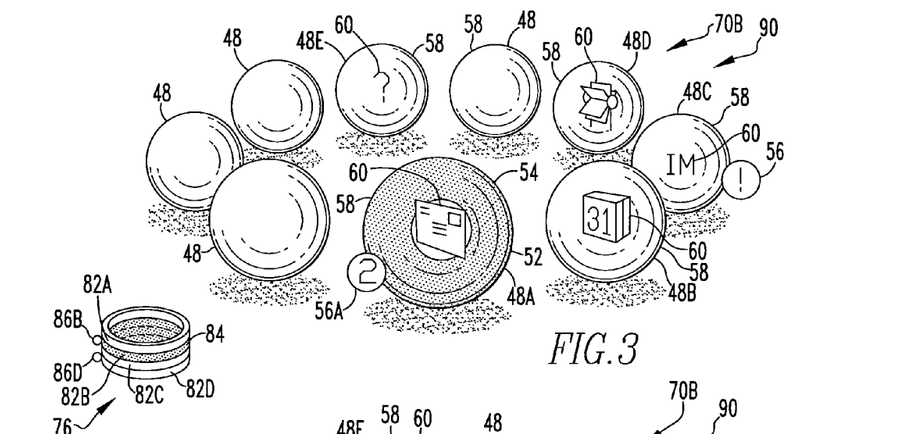
FIG. 3 is an enlarged view of a portion of FIG. 1.

The icons 48 depicted in FIGS. 1 and 3 are disposed about a virtual continuous circuit 50 (see FIG. 7A) which is in the exemplary shape of an ellipse, i.e., a circle viewed from a non-plan perspective. While the circuit 50 is depicted as being a continuous circuit, it is understood that non-continuous circuits such as linear lists of selectable objects, for example, can be employed without departing from the present concept. For purposes of clarity the circuit 50 is expressly depicted only in FIG. 7A, and only a single instance of the circuit 50 is depicted therein. It is noted, however, that the icons 48 of each grouping, such as in each of the rings 70A, 70B, 70C, and 70D in the present example, are movable about a circuit.

The icons 48 are advantageously movable by the user about the circuit 50, and the GUI depicts the icons 48 as being in motion when moving about the circuit 50. As will be set forth in greater detail below, the GUI can additionally depict the group of icons 48 as moving as a group from one location to another. That is, the group of icons 48 that is depicted in FIGS. 1 and 3 can be depicted by the GUI as being in motion from a location disposed on the display 32 to a virtual location off the display 32. The GUI can likewise depict the group of icons 48 in FIGS. 1 and 3 as being in motion from a virtual location off the display 32 to a location disposed on the display 32.

The highlighting of the icon 48A in FIGS. 1 and 3 indicates that the icon 48A is active, meaning that it is currently the icon 48 from among the group of icons 48 that is the active icon 54. When an icon 48 is the active icon 54, a selection focus of the handheld electronic device 4 is directed on the particular icon 48, and a selection input from the user will cause the routine 44 or other feature that is associated with the active icon 54 to be initiated or activated.

A home position 52, which is the lower central position on the circuit 50, and which is depicted by the GUI as being virtually closest to an observer of the display 32, is depicted in FIGS. 1 and 3 as being occupied by the icon 48A. When the icons 48 are depicted as being in a static condition, such as in FIGS. 1 and 3, the active icon 54 is disposed at the home position 52.

Figure 4:
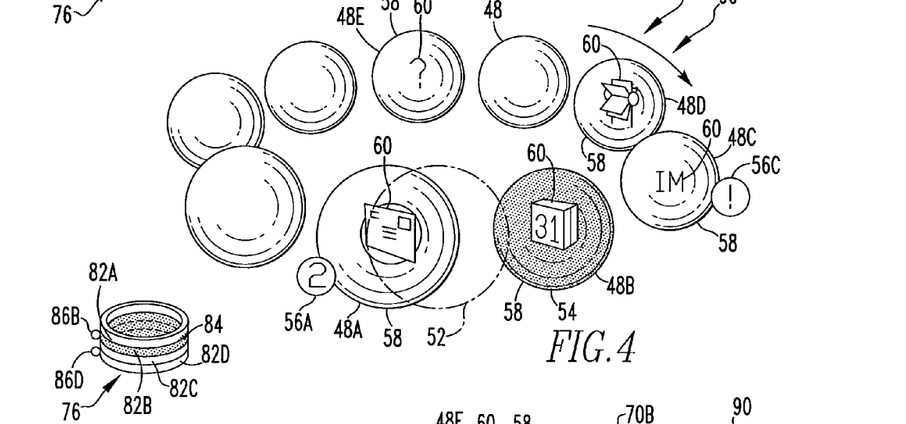
FIG. 4 is a view to similar to FIG. 3, except depicting a group of selectable objects as being in motion about a circuit.
Figure 5:
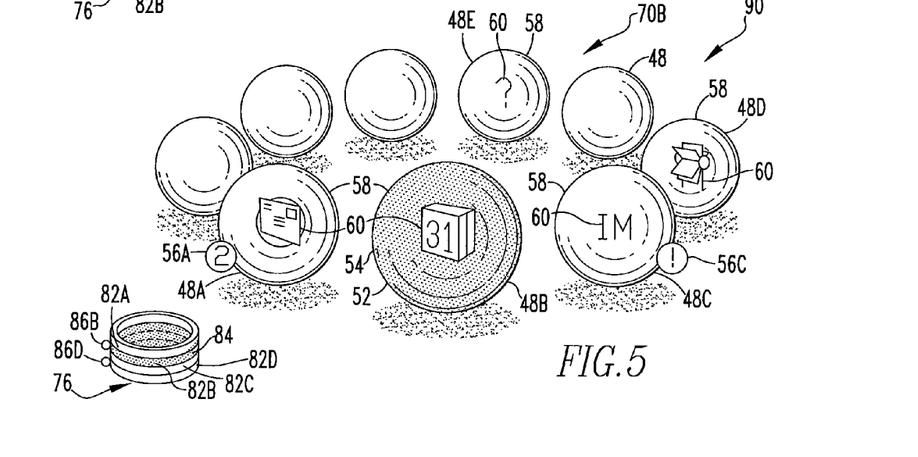
FIG. 5 is a view similar to FIG. 3, except depicting the group of selectable objects in a different arrangement than is depicted in FIG. 3.

As can be understood from FIGS. 4 and 5, the icons 48 are movable about the circuit 50, which in the present example is a closed circuit. Each scrolling input from the track ball 24 causes each icon 48 to move along the circuit 50 to the sequentially next virtual position. Each such scrolling input additionally causes the sequentially next icon 48 adjacent the currently active icon 54 to become the new active icon 54. For example, FIG. 3 depicts the icon 48A as being at the home position 52 and as being the active icon 54. In response to a single scrolling input from the track ball 24, and as is shown in FIG. 4, the GUI depicts the icons 48 as being in motion and also depicts the next sequential icon, i.e., the icon 48B, as being the new active icon 54. That is, in FIG. 4 the icon 48B is depicted as being the active icon 54 prior to reaching the home position 52. The GUI thereafter depicts the icons 48 as being stationary, as is shown in FIG. 5.

As can be understood from FIG. 4, the selection focus was shifted from the icon 48A to the icon 48B responsive to the single scrolling input. That is, the icon 48B is depicted in FIG. 4 as being highlighted and as therefore being the active icon 54 even though the icon 48B has not yet moved to the home position 52. FIG. 5 depicts the icons 48 in a static condition subsequent to the motion of the icons 48 along the circuit 50 and subsequent to the arrival of the icon 48B at the home position 52.

By shifting the selection focus and thus the active icon 54 in response to a scrolling input from the track ball 24, and by indicating the new active icon 54 with highlighting, the user can be immediately apprised of which of the icons 48 is the active icon 54 without having to wait for the active icon 54 to arrive at the home position 52. It therefore can be understood by the user that the icon 48 which is currently the active icon 54, as indicated by the highlighting applied thereto, can be selected by the user by providing a selection input even if the active icon 54 has not yet fully moved into the home position 52. It is understood that the highlighting depicted as being applied to the active icon 54 is merely exemplary, and it is further understood that the identity of the currently active icon 54 could be visually or otherwise communicated to the user in any of a variety of fashions, such as through the use of different colors, different brightnesses, flashing, etc., without limitation.

As can be seen in FIGS. 3-5, a notification 56A is depicted adjacent the icon 48A, and another notification 56C is depicted as being adjacent the icon 48C. The notifications 56A and 56C visually indicate to a user a status or an occurrence of an event or both with respect to a routine or feature which is represented by the icons 48A and 48C. For instance, the icon 48A is an email icon representative of an email routine, and the notification 56A depicts the digit "2" as notifying the user that two new email messages have been received. The notification 56A thus could be said to be indicative of an "occurrence" with respect to the email routine of the reception of one or more email messages. Similarly, the notification 56A could be said to be indicative of a "status" with respect to the email routine of one or more email messages being in an unread condition. Thus, any notifications, such as the notifications 56A and 56C, can be said to be indicative of a status or an occurrence of an event or both, but it is understood that such notifications could additionally or alternatively refer to other situations without limitation.

The icon 48C is an instant messaging icon, and the notification 56C depicts an exclamation point "!" to notify the user that incoming instant messages are being received on the handheld electronic device 4. As can be understood from FIGS. 3-5, when the icons 48A and 48C are depicted as being in motion, the corresponding notifications 56A and 56C are depicting as being correspondingly in motion with the relevant icon 48. The notifications 56 could have an appearance that is different than what is depicted herein or could otherwise be different without departing from the present concept.

Each of the icons 48 is depicted as including a body 58 within which is disposed a descriptive portion 60. The exemplary bodies 58 are all depicted as being spherical, and the descriptive portions 60 are depicted as being representative of the routine or feature that is provided by the icon 48. Advantageously, the descriptive portions 60 do not alter the size or shape of the bodies 58. An apparent three-dimensional depiction is provided by depicting each icon 48, when it is at the home position 52, as being relatively largest among the group of icons 48 in the group, and by depicting the other icons 48 in the group as being progressively smaller as the virtual distance from the home position 52 increases. In this regard, the bodies 58 are implied to be of the same physical size but are depicted as being of varying sizes depending upon the virtual position of the bodies 58 with respect to the home position 52 and with respect to the user.

As mentioned above, the bodies 58 are all of the same size when depicted as being at the home position 52. By depicting the icons 48 as being inherently of the same size, albeit being depicted with a progressively smaller size as the virtual distance from the home position 52 increases, the user can more readily perceive the motion of the icons 48 about the circuit 50 as being motion about a ring. That is, the user can perceive the apparent three-dimensional circular movement of the icons 48 with relatively less direct visual attention than would be required if the icons were of different sizes and/or shapes.

As mentioned above, each scrolling input received from the track ball 24 causes a next sequential icon 48 to become the active icon 54, and it is noted that such sequential shifting of the active icon 54 can be in the "clockwise" or "counter-clockwise" virtual directions or, as will be set forth in greater detail below, in the "up" or "down" virtual directions. While each scrolling input immediately shifts the selection focus to the sequentially next icon 48, such shifting of the selection focus causes the icons 48 to begin moving about the circuit 50 until the currently active icon 54 reaches the home position 52. In the case of a single scrolling input, as is depicted in FIGS. 3-5, the selection focus shifts by one icon 48, and the icons 48 move about the circuit 50 one icon position. Such movement of the icons 48 occurs fairly rapidly, but the movement is still depicted with a speed slow enough to be readily perceived by the user.

When a plurality of scrolling inputs are detected within a predetermined period of time, the movement of the icons 48 about the circuit 50 advantageously accelerates compared with the motion in FIGS. 4 and 5 to more rapidly bring the active icon 54 to the home position 52. For instance, and beginning with FIG. 5, if four scrolling inputs are detected in rapid succession, the movement of the icons 48 about the circuit 50 speeds up, i.e., accelerates, sufficiently that the active icon 54 is never beyond a predetermined distance from the home position 52.

Figure 6:
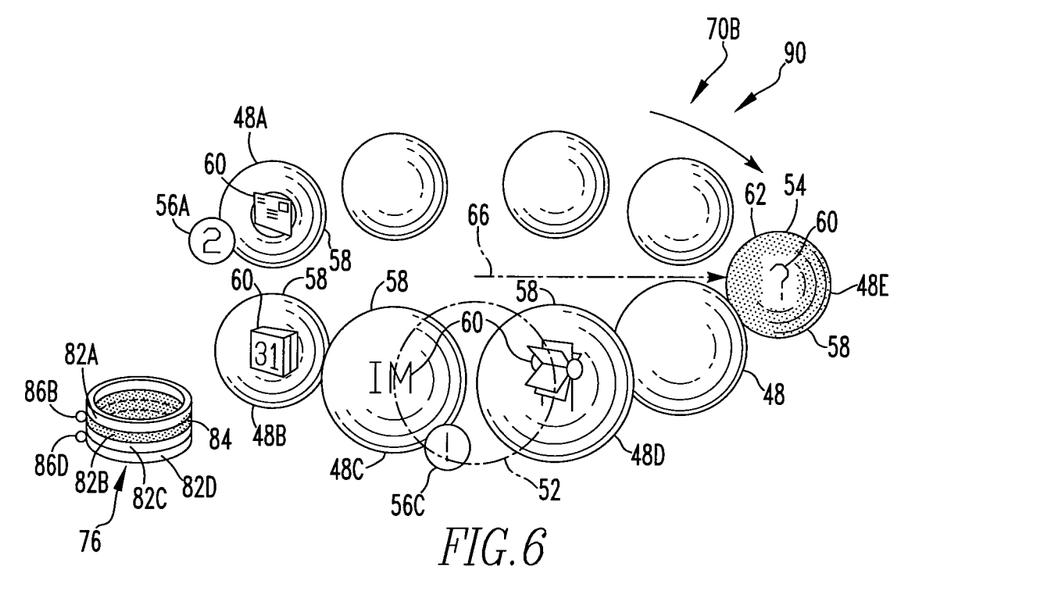
FIG. 6 is a view similar to FIG. 4, except depicting the selectable objects as having been accelerated to a greater velocity than is depicted in FIG. 4.

For instance, if the circuit 50 were viewed from a "plan" perspective, the home position 52 could be considered to be at the six o'clock position. In the present exemplary embodiment, if a plurality of scrolling inputs is detected in rapid succession, the movement of the icons 48 about the circuit 50 accelerates to ensure that the active icon 54 is never farther from the six o'clock home position 52 than either the three o'clock position or the nine o'clock position. By way of example, FIG. 6 depicts the situation where four scrolling inputs are detected in rapid succession subsequent to the system reaching the condition depicted generally in FIG. 5. The aforementioned four scrolling inputs would cause the icon 48E to become the active icon. However, in FIG. 5, i.e., prior to the four scrolling inputs, the icon 48E is at almost the twelve o'clock position, i.e., well beyond the three o'clock position. Thus, in response to the four scrolling inputs in rapid succession, the motion of the icons 48 is accelerated, as is depicted generally in FIG. 6, to ensure that the active icon 54, which is the icon 48E, is never past the three o'clock position, which could be considered to be a maximum distance position 62, as is indicated by the three o'clock arrow 66. That is, the icons 48 would accelerate in one direction about the circuit 50 sufficiently that the icon 48E would "meet" at the maximum distance position 62 the depicted highlighting traveling in the other direction about the circuit 50.

Such acceleration of the icons 48 about the circuit 50 would be of sufficient magnitude to ensure that the active icon 54 is never farther from the home position 52 than the maximum distance position 62. However, in such a situation the continued motion of the icons 48 about the circuit 50 to bring the active icon 54 to the home position 52 would also be depicted as being at a greater velocity than the motion of the icons 48 in FIG. 4.

It thus can be seen that the depicted speed of the icons 48 in moving about the circuit 50 is dynamic and varies with the speed with which scrolling inputs are detected from the track ball 24. Such dynamically variably speed is visually interesting to a user since humans can readily become bored with linear, i.e., unchanging motions. Also, by keeping the active icon 54 no farther than a predetermined distance from the home position 52, i.e., the maximum distance position 62, the user can more readily ascertain which of the icons 48 is the active icon 54. That is, the user will not need to search the entire circuit 50 for the active icon 54, and rather will know in advance generally the region of the circuit 50 where the active icon 54 will be displayed.

It is noted that the aforementioned "predetermined time" within which a plurality of scrolling inputs must be detected in order to cause the movement of the icons 48 about the circuit 50 to accelerate need not necessarily be a fixed period of time. Rather the "predetermined time" condition is met if the icon 48, which is about to become the active icon 54 by virtue of a particular scrolling input, is visually disposed at a location beyond the maximum distance position 62 at the time the particular scrolling input is detected. Thus, if a scrolling input is detected which would cause an icon 48 beyond the maximum distance position 62 to become the active icon 54, the motions of the icons 48 about the circuit 50 will be accelerated until the particular icon reaches the maximum distance position 62, at which point the highlighting will be applied to the particular icon 48 to indicate that it is now the active icon 54. Such acceleration depicts the movement of the icons 48 about the circuit 50 at a high velocity, but it is still advantageously depicted as being of an acceleration and velocity that are visually perceivable by the user. That is, the icons 48 are not depicted as jumping from one location to another, and rather are depicted as moving very rapidly.

As can be understood from FIG. 6, the arrow 66 indicates the maximum distance position 62 as being at the three o'clock position, by way of example. The nine o'clock maximum distance position is not expressly depicted in FIG. 6 for purposes of clarity. It is understood, however, that a rapid sequence of scrolling inputs from the track ball 24 in the opposite direction than is suggested by FIG. 6 would result in acceleration of the icons 48 about the circuit 50 in a counter-clockwise direction sufficiently to ensure that the active icon is never farther from the home position 52 than the nine o'clock maximum distance position.

Figure 6A:
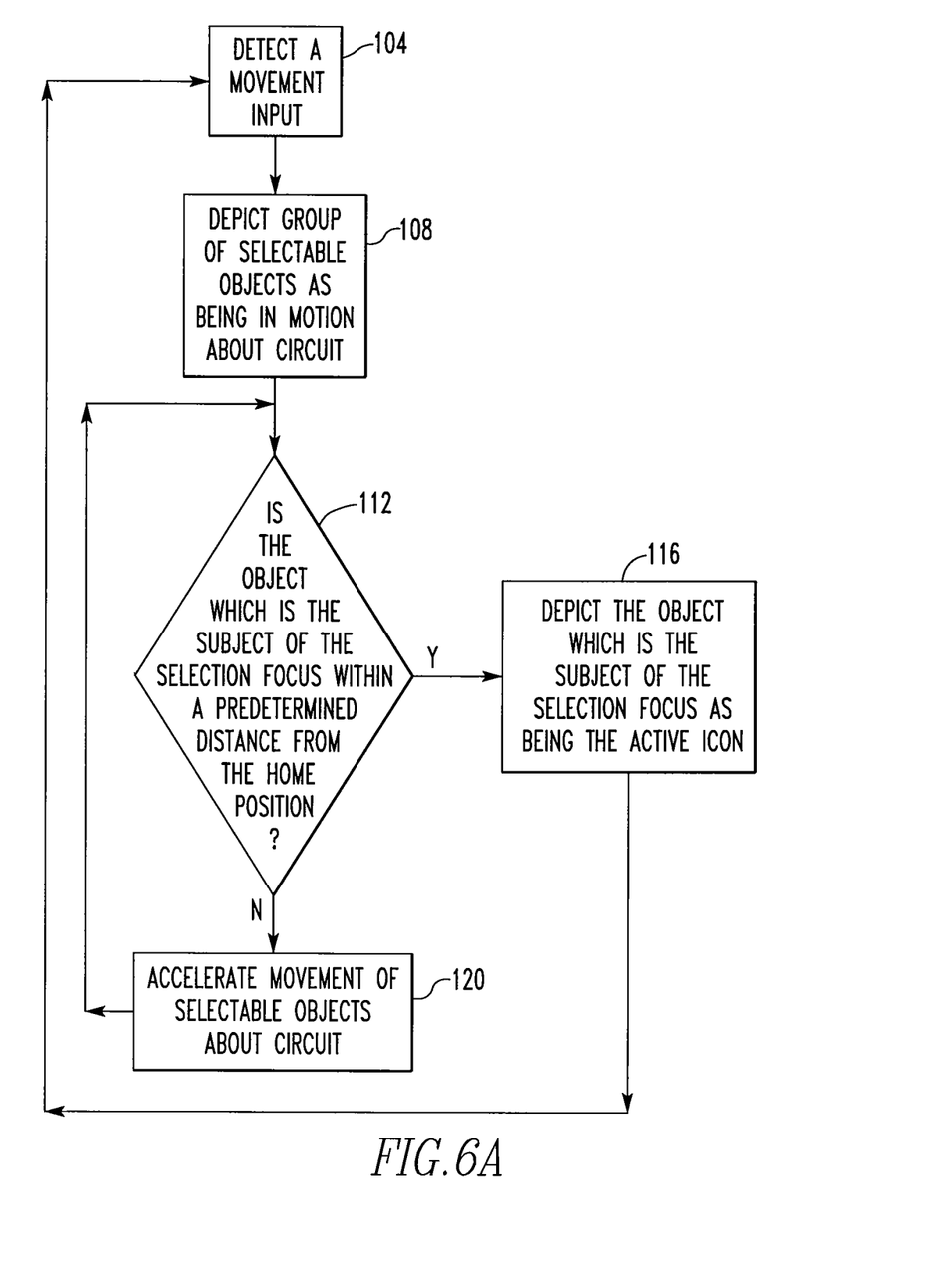
FIG. 6A is a flowchart depicting a portion of an improved method in accordance with the disclosed and claimed concept.

An exemplary flowchart in FIG. 6A depicts in general terms the way in which the depicted velocity of the icons 48 in motion about the circuit 50 can be dynamically adjusted. A movement input is detected, as at 104. The movement input could be generated, for example, by rotating the track ball 24 a predetermined rotational distance, although other types of inputs on the handheld electronic device 4 could be detected as movement inputs. Other types of input devices (not expressly depicted herein) such as joysticks and the like that could be implemented on the handheld electronic device 4 could be employed to provide movement inputs.

Responsive to the movement input detected at 104, the GUI 44 depicts the group of icons 48 that are currently output on the display 32 as being in motion about the circuit 50. It is determined, as at 112, whether the icon 48 which is currently the subject of the selection focus is within a predetermined distance along the circuit 50 from the home position 52. An exemplary predetermined distance is depicted with the arrow 66 in FIG. 6 at the maximum distance position 62, although other predetermined distances may be employed.

If it is determined, as at 112, that the icon 48 which is the subject of the selection focus is within the predetermined distance along the circuit 50 from the home position 52, such icon 48 is depicted as being the active icon 54. In the exemplary embodiment depicted herein, this would be accomplished by applying highlighting to that icon 48, thus depicting such icon 48 as being the active icon 54. Processing thereafter continues, as at 104, where an additional movement input can be detected.

On the other hand, if it is determined, as at 112, that the icon 48 which is currently the subject of the selection focus is not within the predetermined distance along the circuit 50 from the home position 52, the GUI depicts, as at 120, the movement of the icons 48 about the circuit 50 as being visually accelerated. That is, the depicted velocity of the icons 48 about the circuit 50 is increased.

Processing thereafter continues to 112 where it can again be determined whether or not the icon 48 which is currently the subject of the selection focus has come within the predetermined distance from the home position 52. If, for example, the icon 48 which is the subject of the selection focus is still not within the predetermined distance from the home position 52, processing can continue, as at 120, where the GUI further accelerates the depicted movement of the icons 48 about the circuit 50. In this regard, it is understood that data processing about the loop that comprises the elements 112 and 120 can occur quite rapidly, whereby movement of the icons 48 about the circuit 50 can be rapidly accelerated to ensure that the active icon 54 is never depicted as being beyond the maximum distance position 62.

The group of icons 48 depicted in FIGS. 1 and 3-6 are only one group of icons 48 from among a plurality of such groups. In the exemplary embodiment depicted herein, the GUI manages four groups of icons 48, with each group of icons 48 being depicted as being arranged in the shape of a ring. The groups or rings 70 of icons 48 are depicted with the numerals 70A, 70B, 70C, and 70D. The rings 70A, 70B, 70C, and 70D are virtually disposed in a stack 72 which is depicted in FIG. 7A. The stack 72 is represented by the indicator 76 in FIGS. 1 and 3-6. While the stack 72 is depicted as being a vertical stack, it is understood that a plurality of groups of icons 48 could be in a "stacked" arrangement with the groups being disposed virtually adjacent one another in a horizontal direction or in other directions without departing from the current concept.

Figure 7:
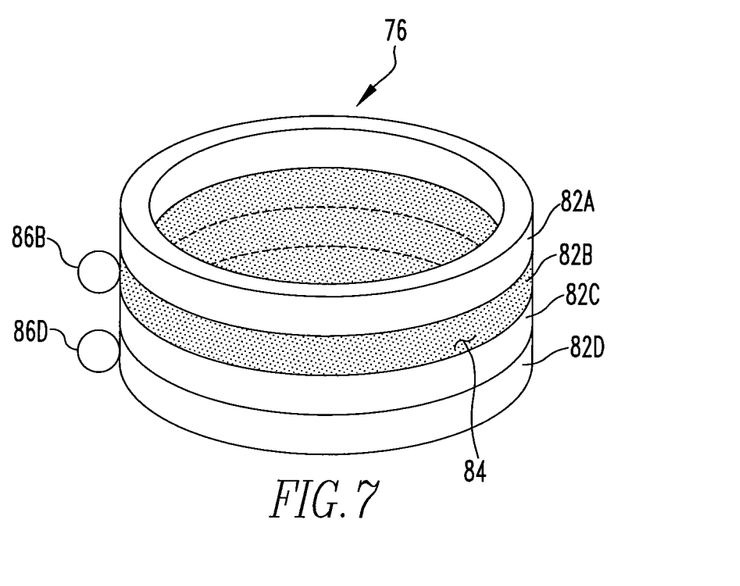
FIG. 7 is an enlarged view of a portion of FIG. 1.
Figure 7A:
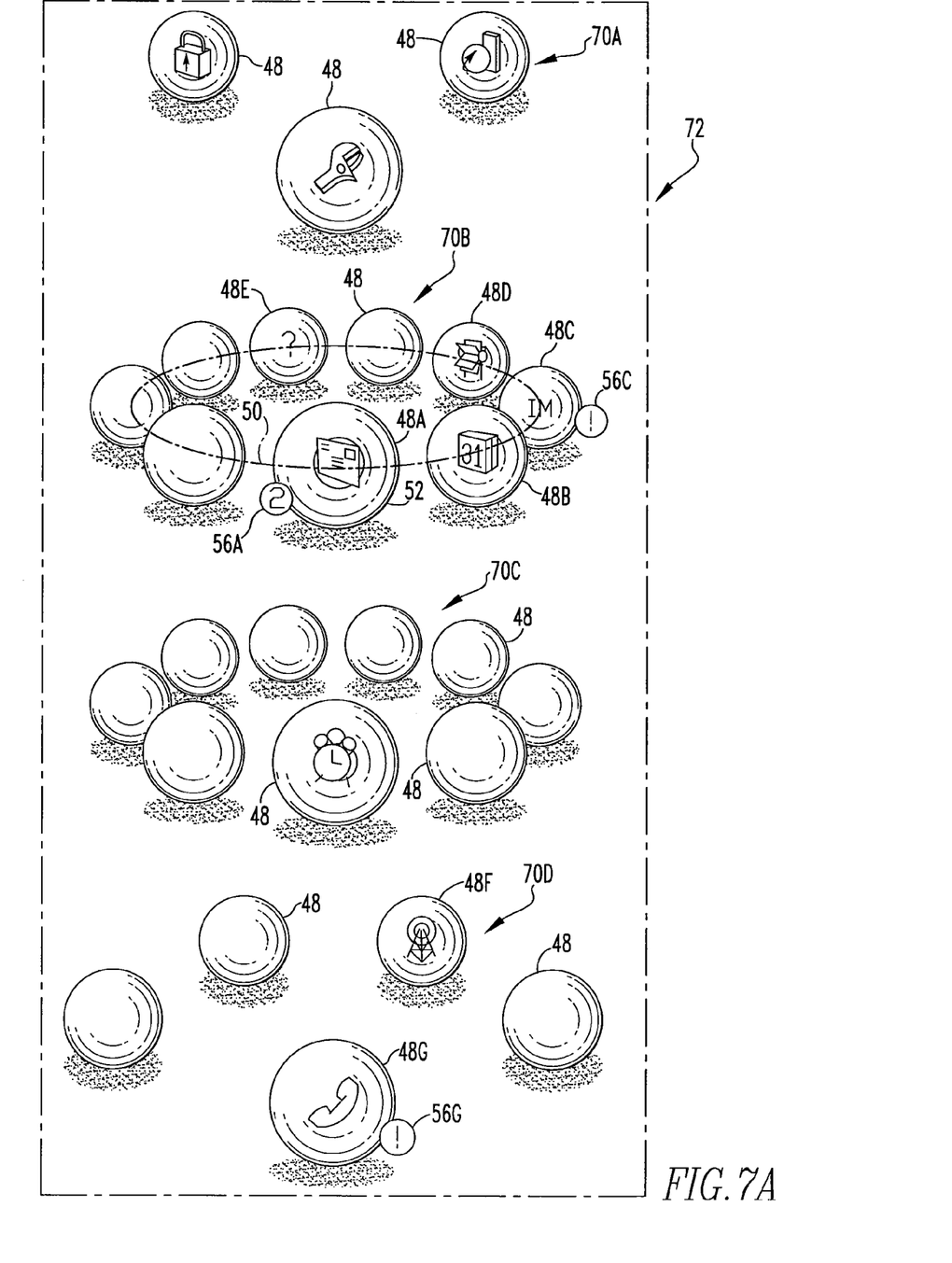
FIG. 7A is a virtual view of a stacked plurality of groups of selectable objects.

The indicator 76 of FIG. 1 is depicted in an enlarged fashion in FIG. 7. The indicator 76 comprises a plurality of stacked elements 82, which would include the stacked elements 82A, 82B, 82C, and 82D which, respectively, are representative of the rings of icons 70A, 70B, 70C, and 70D.

As can be understood from FIG. 7, the stack 72 includes an attribute 84 in the form of highlighting of the stacked element 82B. The attribute 84 visually indicates that the ring 70B is active on the display 32 and thus can be considered to currently be an active ring 90. It is understood that the attribute 84 could be different than depicted herein without departing from the present concept. For instance, the attribute 84 could be a flashing of the stacked element 82B, a depiction of the stacked element 82B in a color different than the other stacked elements 82A, 82C, and 82D, or another type of representation.

Figure 9:
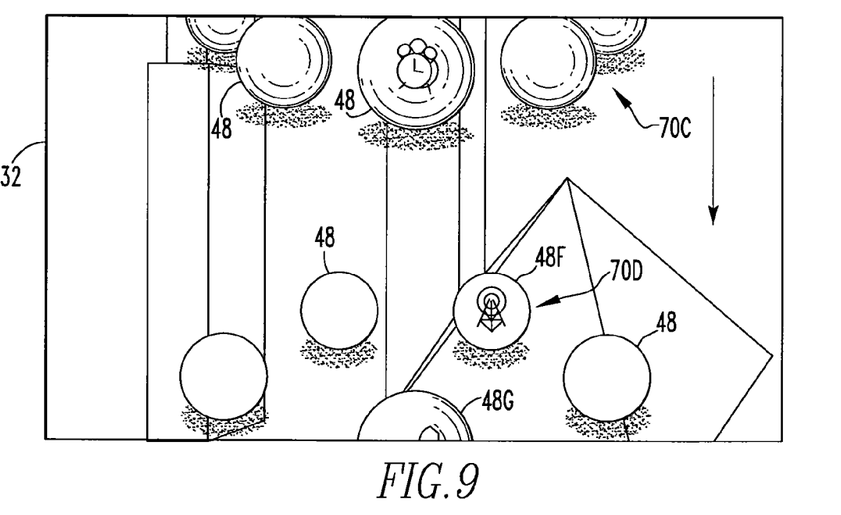
FIG. 9 is a view of a display of handheld electronic device of FIG. 1, and visually depicting the movement of one group of selectable objects off the display and the simultaneous movement of another group of selectable objects onto the display.

The ring 70 that comprises the active icon 54 can be considered to be the active ring 90 and is depicted as being disposed on the display 32 although, as set forth in greater detail below, the active ring 90 can be represented as moving onto the display 32. For instance, if from the position of FIGS. 1 and 7 the user entered two scrolling inputs in the downward direction, the active ring 90 would shift from being the ring 70B to being the ring 70D. Upon such virtual downward shifting of the active ring 90, the various rings 70 would be depicted as moving vertically on the display 32 by operation of the GUI until the currently active ring 90 is depicted as being disposed on the display 32. For instance, FIG. 9 depicts the movement of the ring 70C upward from a position formerly on the display 32 toward a position virtually disposed off the display 32, and further displays the ring 70D as moving from a position virtually off the display 32 toward a position on the display 32. Such depicted movement of the rings 70 helps the user to visualize the fact that the icons 48 are in groups, i.e., rings 70, and that the active ring 90 can be shifted from one ring 70 to another ring 70. The depiction with the GUI of the vertical movement of the rings 70 as a result of shifting of the active ring 90 from one ring 70 to another moreover illustrates that the rings 70 are disposed in a virtually stacked arrangement, as is indicated by the stack 72 in FIG. 7A.

In addition to the indicator 76 possessing the attribute 84 which indicates the one of the rings 70 that is currently the active ring 90, the indicator 76 additionally includes an indicium 86B which is displayed adjacent the stacked element 82B and which is indicative of the notifications 56A and 56C that exist with respect to the icons 56A and 56C in the ring 70B. The exemplary indicium 86B is depicted as being disposed adjacent the stacked element 82B in the accompanying figures. In the present example, the indicator 76 additionally includes another indicium 86D which is indicative of a notification 56G that is applicable to the icon 48G in FIG. 10 and which indicates the occurrence of an event with respect to the routine which is represented by the icon 48G, in the present example a telephone routine. The indicium 86D is depicted as being disposed adjacent the stacked element 82D which is representative of the ring 72D. The indicium 86B and the other indicium 86D can collectively be referred to as the indicia 86, which term would similarly comprise an indicium with respect to either or both of the rings 70A and 70C.

As can best be seen in FIG. 7, the attribute 84 and the indicia 86 are depicted as having different appearances. For instance, the attribute 84 is depicted, by way of example, as a highlighting of the stacked element 82B, whereas the indicia 86B and 86D are depicted as being dot indicators disposed adjacent the stacked elements 82B and 82D. The different appearances afforded to the attribute 84 and the indicia 86 thus enable the indicator 76 to indicate simultaneously which of the rings 70 is currently the active ring 90 as well as which of the rings 70 possess one or more notifications 56 with respect to its icons 48.

The exemplary indicium 86D is not depicted as being representative of the particular quantity of icons 48 in the ring 70D which have experienced the occurrence of an event. For instance, whereas the indicium 86D is representative of a single notification 56, i.e., the notification 56G, the indicium 86B is indicative of two notifications 56, i.e., the notifications 56A and 56G. Despite the similar appearance of the indicia 86B and 86D, it is understood, of course, that the indicia 86 could be given appearances that are indicative of the number of notifications 56 that exist with respect to icons 48 in that particular ring 70 and/or that may be based upon the severity or significance of the notifications 56, such as might be set forth in a user profile. It is understood that such different types of appearances would be within the scope of the present concept.

The makeup of the rings 70 is completely customizable by the user. That is, a user can select which icons 48 will be grouped together in a ring 70, can determine the number of rings 70, and can determine the stacked arrangement of the rings 70. Also, the user can select the specific positional arrangement of the icons 48 within any given ring 70.

Figure 10:
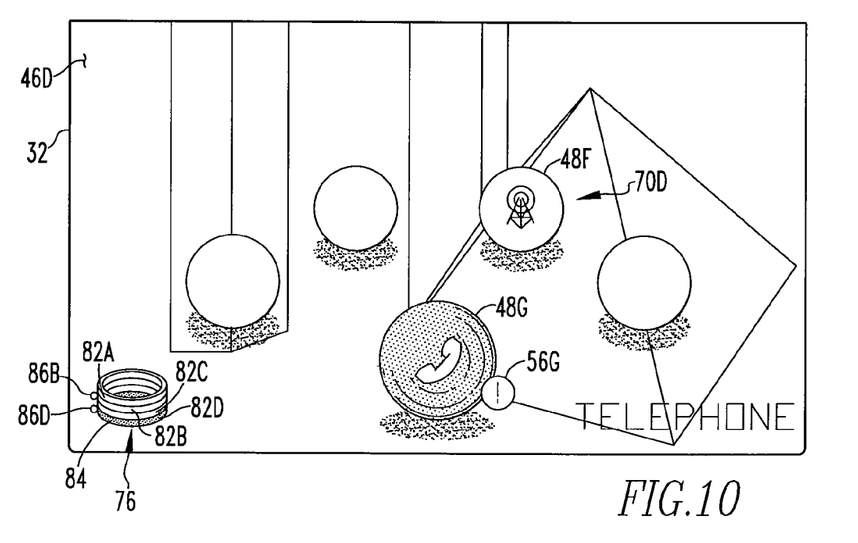
FIG. 10 is a view of the display depicting a different group of selectable objects than is depicted in FIG. 1.

The user can additionally add a legend to each ring 70, if desired. For instance, FIG. 1 depicts the legend "MESSAGES", and FIG. 10 depicts the legend "TELEPHONE". It thus will be apparent that a user can customize the icons 48 and rings 70 such that the icons 48 which are representative of routines 44 that provide similar or complementary functions are together disposed in one ring 70. For example, the various icons 48 in the ring 70B, or at least some of them, might relate generally to the sending and receiving of messages. The user may thus also choose to display the legend "MESSAGES" when the ring 70B is the active ring 90 as an additional indication of which of the rings 70 is currently the active ring 90. Additional instances of customizability will be apparent.

Figure 8:
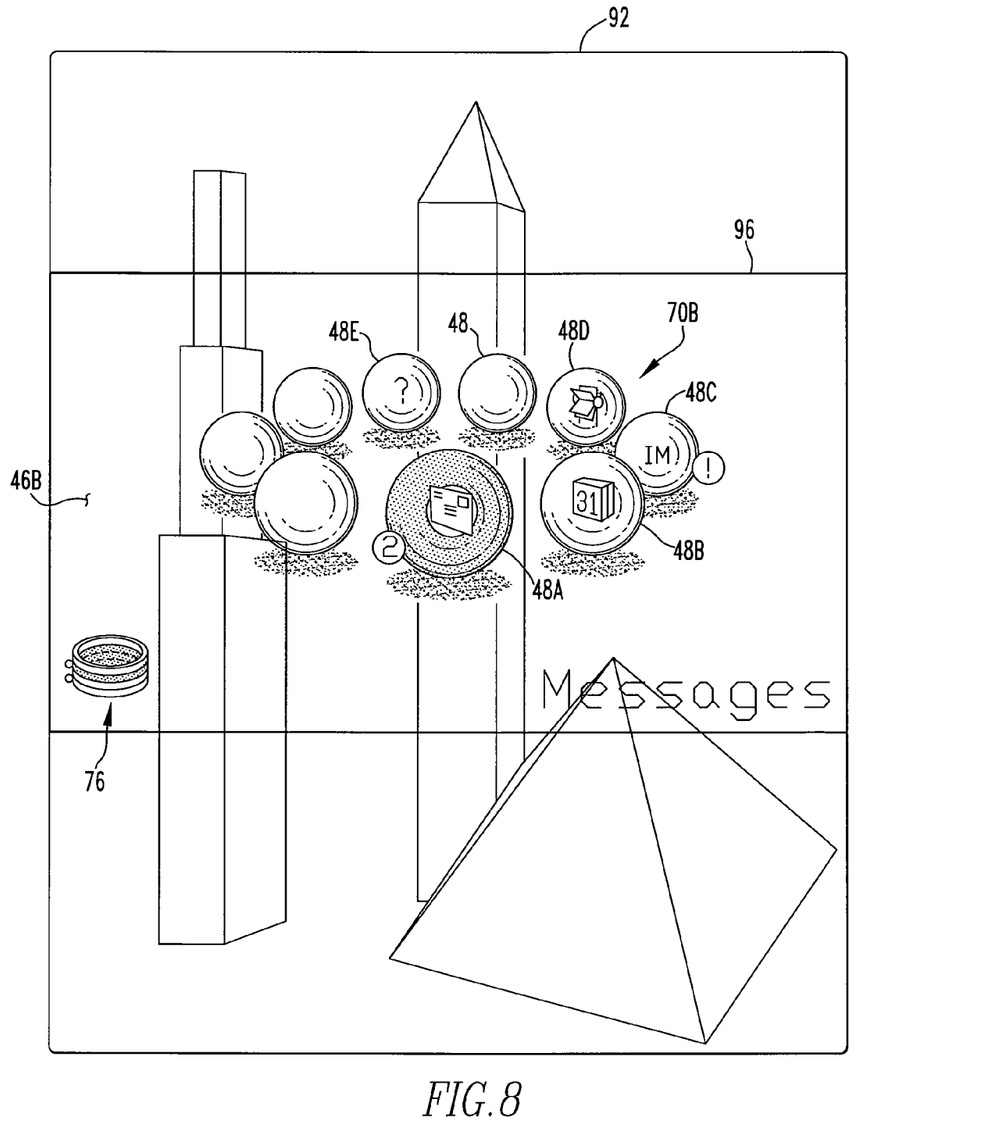
FIG. 8 is a view of a full background which, in various parts, can be depicted on the handheld electronic device of FIG. 1.

As mentioned above, the attribute 84 enables the indicator 76 to indicate which of the rings 70 in the stack 72 is the active ring 90. The GUI advantageously provides another mechanism for indicating to the user which of the rings 70 is currently the active ring 90. Specifically, a full background 92 is depicted in FIG. 8. An enclosure 96 in FIG. 8 encloses a region of the full background 92 that is depicted as the background 46B in FIG. 1. It can be seen that the full background 92 is larger, i.e., is of a greater dimension, than the display 32 in the direction in which the rings 70 are stacked. That is, in the exemplary embodiment depicted herein, the rings 70 are stacked in the vertical direction, and the full background 92 thus is longer in the vertical direction, i.e., is taller, than the display 32. As each successive ring 70 is depicted on the display 32 and becomes the active ring 90, a different portion of the full background 92 is depicted on the display 32. For instance, the background 46D depicted in FIG. 10 is the bottom-most portion of the full background 92 and corresponds with the ring 70D being the active ring 90. The background 46B corresponds with the ring 70B and is depicted on the display 32 when the ring 70B is active, as in FIG. 1. The changing of the background 46 in correspondence with whichever of the rings 70 is active on the handheld electronic device provides an additional indicator to the user which of the rings 70 is the active ring 90. Moreover, the changing background 46 is something that the user will mentally perceive while operating the handheld electronic device 4 without necessarily needing to look directly at any particular portion of the display, such as at the indicator 76 in the lower left corner of the depicted exemplary embodiment. That is, simply by using the handheld electronic device in the ordinary course, the user at least minimally perceives the background 46 on the display 32, and over time the user will become familiar with which portion of the background corresponds with any particular ring 70 and thus will at least subliminally be apprised of the particular ring 70 that is currently the active ring 90 as well as the relative position in the stack 72 of the currently active ring 90. For instance, the full background 92 includes a number of tall features which vary at different vertical locations. The user could be enabled to customize the full background depending upon the user's tastes and interests.

In order to further illustrate the stacked arrangement of the rings 70 to the user, the portion of the full background 92 that is depicted as the background 46 on the display 32 can be depicted as being in motion along the vertical direction of the full background 92 simultaneously with vertical movement of the rings 70, such as is depicted in FIG. 9. Again, it is understood that the present concept is not limited to vertical arrangements of object such as groups of icons 48, and it is expressly indicated that the arrangements could be stacked in other directions, both linear and nonlinear as needed.

As suggested above, in addition to a scrolling input in the vertical direction shifting the active ring 90 to the sequentially next ring 70, such vertical scrolling inputs additionally move the active icon 54 from an icon 48 in the currently active ring 90 to a different icon 48 in the sequentially next ring 70, i.e., the ring 70 which sequentially becomes the next active ring 90. The determination of which icon 48 in the next successive ring 70 will become the active icon 54 can be customized by the user according to any of a variety of criteria. For instance, the user might affirmatively select which icon 48 in any given ring 70 should become the active icon 54 upon that ring 70 becoming the active ring 90. Alternatively, the user might customize the system such that an icon 48 having a notification 56 applicable thereto could become the active icon 54 upon that particular ring 70 becoming the active ring 90. Other types of customization will be apparent and are within the scope of the current concept.

In the depicted exemplary embodiment, the GUI provides both the indicator 76 as well as the background 46 as a portion of the full background 92. Since both the indicator 76 and the background 46 provide to a user information regarding which ring 70 in the stack 72 is currently the active ring 90, as well as the relative positioned in the stack of the active ring 90, it is understood that the background 46 and the indicator 76 could be employed independently or together without departing from the present concept. It is also understood that the various concepts described herein can be employed in different combinations within the scope of the present concept.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method of enabling the outputting of a number of selectable objects on a display of a handheld electronic device, the selectable objects being arranged into a plurality of groups of selectable objects logically disposed in a stack, the method comprising:
   employing a graphical user interface to visually output a depicted group of selectable objects at a primary region of the graphical user interface, the primary region comprising the majority of the area of the display, the depicted group of selectable objects being a first group selected from the plurality of groups of selectable objects in their stacked arrangement, and being the only selectable objects displayed at the primary region of the graphical user interface;
   outputting at a periphery region of the graphical user interface separated from the primary region an indicator comprising an icon of undescribed elements representative of the plurality of groups in their stacked arrangement and an attribute indicative of the logical position in the stack of the undescribed element representing the first group;
   outputting as an indicium a visual item disposed adjacent another of the undescribed elements that is representative of a second group of the plurality of groups different than the first group and indicative of an occurrence of an event with respect to a selectable object within the second group, the second group not presently depicted; and
   responsive to a scrolling input, depicting the selectable objects of the first group as being in motion about a circuit, wherein no additional elements associated with any of the plurality of groups of selectable objects, other than the depicted group of selectable objects, are displayed at the primary region of the graphical user interface.

2. The method of claim 1, further comprising outputting the attribute indicative of the logical position in the stack of the undescribed element representing the first group with an appearance different than that of the other undescribed elements.

3. The method of claim 1, further comprising outputting the attribute with a first appearance and outputting the indicium with a second appearance different than the first appearance.

4. The method of claim 1, wherein the depicted group of selectable objects is displayed in a predetermined arrangement, and further comprising outputting as the undescribed elements a plurality of elements of a shape that corresponds with at least a portion of the predetermined arrangement.

5. The method of claim 1, further comprising:
   detecting a selection input with respect to the second group, the first group being logically disposed in the stack in a particular direction from the second group;
   employing the graphical user interface to depict the second group as being in motion in the particular direction; and
   outputting the second group as the depicted group.

6. The method of claim 5, further comprising employing the graphical user interface to depict the second group as moving in the particular direction from a location logically disposed off the display toward another location on the display.

7. The method of claim 6, further comprising employing the graphical user interface to depict the first group as moving in the particular direction from a first location on the display toward a different location logically disposed off the display.

8. The method of claim 5, further comprising:
   employing the graphical user interface to output as a background on the display a portion of a visual object that is larger in the particular direction than the display; and
   employing the graphical user interface to depict the background as being in motion in the particular direction contemporaneously with the depicting of the second group as being in motion in the particular direction.

9. A handheld electronic device comprising:
   a processor apparatus comprising a processor and a memory;
   an input apparatus structured to provide input to the processor apparatus;
   an output apparatus comprising a display and being structured to receive output signals from the processor apparatus;
   the memory having stored therein a number of routines comprising a graphical user interface routine, the routines comprising instructions which, when executed on the processor, cause the handheld electronic device to perform operations for enabling the outputting of a number of selectable objects on the display, the selectable objects being arranged into a plurality of groups of selectable objects logically disposed in a stack, the operations comprising:
      employing a graphical user interface to visually output a depicted group of selectable objects at a primary region of the graphical user interface, the primary region comprising the majority of the area of the display, the depicted group of selectable objects being a first group selected from the plurality of groups of selectable objects in their stacked arrangement and being the only selectable objects displayed at the primary region of the graphical user interface;
      outputting at a periphery region of the graphical user interface separated from the primary region an indicator comprising an icon of undescribed elements representative of the plurality of groups in their stacked arrangement and an attribute indicative of the logical position in the stack of the undescribed element representing the first group; and
      outputting as an indicium a visual item disposed adjacent another of the undescribed elements that is representative of a second group of the plurality of groups different than the first group and indicative of an occurrence of an event with respect to a selectable object within the second group, the second group not presently depicted;
      responsive to a scrolling input, depicting the selectable objects of the first group as being in motion about a circuit, wherein no additional elements associated with any of the plurality of groups of selectable objects, other than the depicted group of selectable objects, are displayed at the primary region of the graphical user interface.

10. The handheld electronic device of claim 9, wherein the operations further comprise outputting the attribute indicative of the logical position in the stack of the undescribed element representing the depicted first group with an appearance different than that of the other undescribed elements.

11. The handheld electronic device of claim 9, wherein the operations further comprise outputting the attribute with a first appearance and outputting the indicium with a second appearance different than the first appearance.

12. The handheld electronic device of claim 9, wherein the depicted group of selectable objects is displayed in a predetermined arrangement, and wherein the operations further comprise outputting as the undescribed elements a plurality of elements of a shape that corresponds with at least a portion of the predetermined arrangement.

13. The handheld electronic device of claim 9 wherein the operations further comprise:
   detecting a selection input with respect to the second group, the first group being logically disposed in the stack in a particular direction from the second group;
   employing the graphical user interface to depict the second group as being in motion in the particular direction; and
   outputting the second group as the depicted group.

14. The handheld electronic device of claim 13 wherein the operations further comprise employing the graphical user interface to depict the second group as moving in the particular direction from a location logically disposed off the display toward another location on the display.

15. The handheld electronic device of claim 14 wherein the operations further comprise employing the graphical user interface to depict the first group as moving in the particular direction from a first location on the display toward a different location logically disposed off the display.

16. The handheld electronic device of claim 13 wherein the operations further comprise:
   employing the graphical user interface to output as a background on the display a portion of a visual object that is larger in the particular direction than the display; and
   employing the graphical user interface to depict the background as being in motion in the particular direction contemporaneously with the depicting of the second group as being in motion in the particular direction.

* * * * *